United States Patent
Ariyoshi et al.

[11] Patent Number: 6,049,536
[45] Date of Patent: Apr. 11, 2000

[54] CDMA COMMUNICATION METHOD AND SPREAD SPECTRUM COMMUNICATION SYSTEM

[75] Inventors: Masayuki Ariyoshi, Mitaka; Takashi Yano, Tokorozawa; Hironari Masui, Yokohama; Nobukazu Doi, Hachioji, all of Japan

[73] Assignee: Hitachi, Ltd., Japan

[21] Appl. No.: 08/866,440

[22] Filed: May 30, 1997

[30] Foreign Application Priority Data

Jun. 5, 1996 [JP] Japan .................................. 8-142449

[51] Int. Cl.[7] .................................................. H04B 7/216
[52] U.S. Cl. ............................................. 370/335; 370/342
[58] Field of Search .................................... 370/335, 342, 370/328, 329, 341, 431, 441, 368, 330; 455/422; 375/200

[56] References Cited

U.S. PATENT DOCUMENTS

| | | | |
|---|---|---|---|
| 4,943,974 | 7/1990 | Motamedi | 375/1 |
| 5,128,959 | 7/1992 | Bruckert | 375/1 |
| 5,563,907 | 10/1996 | Lomp | 375/206 |
| 5,574,747 | 11/1996 | Lomp | 375/200 |
| 5,612,703 | 3/1997 | Mallinckrodt | 342/457 |
| 5,790,587 | 8/1998 | Smith et al. | 375/200 |
| 5,796,772 | 8/1998 | Smith et al. | 375/200 |
| 5,805,633 | 9/1998 | Uddenfeldt | 375/202 |
| 5,815,525 | 9/1998 | Smith et al. | 375/200 |

*Primary Examiner*—Ajit Patel
*Assistant Examiner*—Brian Nguyen
*Attorney, Agent, or Firm*—Sofer & Haroun, LLP

[57] ABSTRACT

A frequency band for communication between a base station and mobile stations is divided into a reverse-link and a forward-link bands. In each of these bands, carrier frequencies are defined in correspondence with sub frequency bands each having one of several bandwidths. To each of these bands of each mobile station, a sub frequency band with a bandwidth matching a data traffic rate is assigned in advance. Each mobile station spectrum-spreads a reservation packet and transmits the resultant packet by a prescribed carrier frequency corresponding to the reverse-link sub frequency band. The base station spectrum-spreads a response packet and transmits the resultant packet by a prescribed carrier frequency corresponding to the forward-link sub frequency band. Each mobile station spectrum-spreads a data packet by a spreading code for data traffic channel specified in the response packet and transmits the resultant packet by the reverse-link carrier frequency.

9 Claims, 12 Drawing Sheets

CDMA COMMUNICATION METHOD AND SPREAD SPECTRUM COMMUNICATION SYSTEM

BACKGROUND OF THE INVENTION

The present invention relates to a communication method based on CDMA (Code Division Multiple Access) and a communication system, more particularly, to a CDMA communication method and a spread spectrum communication system both suitable for packet transmission.

In CDMA communication, a signal to be transmitted is multiplied by a spreading code to spread the resultant signal over a wide band for communication and spreading codes having different patterns are assigned to different channels to multiplex many signals for communication. The CDMA communication is excellent in security and high in frequency usage efficiency and stability, finding suitable applications in mobile communication and cable transmission, some of them currently being put into practical use.

The inventors hereof proposed a mobile communication system for efficiently transmitting data packets based on such CDMA communication (refer to U.S. patent application Ser. No. 08/690819). In this proposition, the wireless channels between a base station and a plurality of mobile stations have a reservation channel for transmitting reservation packets from the mobile stations to the base station, a response channel for transmitting response packets from the base station to the mobile stations, and a data traffic channel for transmitting data packets along the reverse link running from the mobile stations to the base station and the forward link running from the base station to the mobile stations.

Before starting data transmission, each of the mobile stations with transmitted data ready requests the base station for the allocation of the data traffic channel and a time slot to be used. As shown in FIG. 12, this request (the request for reservation) is made by transmitting the reservation packet including a mobile station ID to the reservation channel. It should be noted that spectrum-spreading the reservation packet by a spreading code allows each mobile station to transmit the reservation packet any time.

According to the reservation packet received at the reservation channel, the base station assigns, for each mobile station, the data traffic channel and the time slot to be used (scheduling shown in FIG. 12) and transmits the information thereof to the response channel as a response packet. Receiving the response packet including own ID, each mobile station transmits the data packet in the time slot specified in the data traffic channel specified in this response packet.

In transmitting a data packet from the base station to a mobile station, the base station transmits a response packet for reception control specified with the ID of the destination mobile station, a data traffic channel, and a time slot to the above-mentioned response channel. Receiving the response packet for reception control including own ID, each mobile station receives a data packet in the specified time slot on the data traffic channel specified in this response packet.

The above-mentioned reservation channel, response channel, and data traffic channel each have a predetermined frequency bandwidth assigned to the mobile communication system to form the system frequency band. These plurality of channels are multiplexed by spreading codes having different patterns for these channels and a common chip rate, resulting in the same bandwidth throughout the channels.

On the other hand, the information to be transmitted by each mobile station are various; for example, the data includes low-bit-rate audio information and facsimile information and high-bit-rate data and images. Conventionally, these various pieces of information are transmitted by changing the number or length of packets according to transfer rates used. Therefore, in the prior-art technology, various pieces of data can be integrated into one unit but it is difficult to handle each piece of information independently, thereby lowering the flexibility in communication service.

SUMMARY OF THE INVENTION

It is therefore an object of the present invention to provide a novel CDMA communication method and a novel spread spectrum communication system enhanced in communication service flexibility by overcoming the above-mentioned problems involved in the prior-art technology and handling each piece of information.

In carrying out the invention and according to one aspect thereof, there is provided a CDMA communication method in which the frequency bands in the communication channel between a base station and a plurality of mobile stations is divided into a frequency band for transmitting a forward-link packet and a frequency band for transmitting a reverse-link packet, each of these frequency bands being further divided into sub frequency bands having different center frequencies. Next, these center frequencies are defined as a plurality of carrier frequencies corresponding to sub frequency bands. A reverse-link sub frequency band and a forward-link sub frequency band that have bandwidths matching the data traffic rate are assigned to each mobile station in advance. Then, each mobile station spectrum-spreads a reservation packet by a spreading code for reservation channel and then transmits the resultant packet by a prescribed carrier frequency corresponding to the reverse-link sub frequency band. Next, the base station spectrum-spreads a response packet by a spreading code for response channel and then transmits the resultant packet by a prescribed carrier frequency corresponding to the forward-link sub frequency band. Subsequently, each mobile station spectrum-spreads a data packet by a spreading code of a data traffic channel specified in the response packet and then transmits the resultant packet by the prescribed reverse-link carrier frequency.

This novel communication method allows each piece of data to be independently transmitted by use of a sub frequency band having a bandwidth matching the bit rate of the data to be transmitted, thereby enhancing flexibility in communication service.

It should be noted that a signal to be transmitted in a reservation packet is a control signal having a low bit rate requesting for a data traffic channel and a time slot, so that the signal can be transmitted by the sub frequency band having the narrowest bandwidth. Therefore, in practice, it is preferable that each mobile station is assigned with one of sub frequency bands having the narrowest bandwidth of a plurality of bandwidths as the band for the reverse-link control channel and transmits the spectrum-spread reservation packet by the carrier frequency corresponding to the sub frequency band for the control channel and the data packet by a prescribed carrier frequency other than the carrier frequency for the control channel.

To realize the above-mentioned novel communication method, the base station comprises a plurality of receiving means that operate by one of a plurality of carrier frequencies defined in the reverse-link frequency band in advance, each of the receiving means having a plurality of demodulating means for demodulating a reservation packet and a data packet by spectrum-despreading an output signal of each receiving means. The base station further comprises a plurality of transmitting means that operate by one of a plurality of carrier frequencies defined in the forward-link frequency band in advance, each of the transmitting means having a plurality of modulating means for spectrum-spreading a response packet and a data packet to output resultant packets.

As the reverse-link and forward-link frequency bands to be used, each of the plurality of mobile stations is assigned with frequency bands of a plurality of sub frequency bands related to each of the carrier frequencies that has a bandwidth matching a data traffic rate of each of the mobile stations. Each mobile station comprises a receiving means that operates by the carrier frequency corresponding to the sub frequency band that provides the forward-link frequency band and a demodulating means for demodulating the response packet and a received data packet by despreading an output signal outputted from the receiving means. Each mobile station further comprises a transmitting means that operates by the carrier frequency corresponding to the sub frequency band that provides the reverse-link frequency band and a modulating means for spectrum-spreading the reservation packet and a transmitted data packet and transmitting resultant packets to the transmitting means.

Each of the demodulating means of the base station may be constituted by a response packet demodulating circuit for sequentially spectrum-spreading the response packet addressed to each mobile station by a predetermined spreading code and a data packet demodulating circuit for spectrum-spreading the data packet addressed to each mobile station by a spreading code unique to each data traffic channel.

Each of the modulating means of the base station may be constituted by a response packet modulating circuit for sequentially spectrum-spreading the response packet addressed to each mobile station by a predetermined spreading code and a data packet modulating circuit for spectrum-spreading by a spreading code unique to each data traffic channel.

Each data packet demodulating circuit of the base station may be constituted by a circuit for despreading the output signal of the receiving means by the spreading code of a prescribed chip rate corresponding to the carrier frequency of each receiving means. Each data packet demodulating circuit may be constituted by a circuit for spectrum-spreading the data packet addressed to each mobile station by the spreading code of a prescribed chip rate corresponding to the carrier frequency of each receiving means.

The demodulating means of each mobile station may be constituted by a circuit for despreading the output signal of the receiving means by the spreading code of a prescribed chip rate corresponding to the carrier frequency of the receiving means. The modulating means of each mobile station may be constituted by a circuit for spectrum-spreading a transmitted data packet by the spreading code of a prescribed chip rate corresponding to the carrier frequency of the transmitting means.

These and other objects and many of the attendant advantages of the invention will be readily appreciated as the same becomes better understood by reference to the following details description when considered in connection with the accompanying drawings.

DETAILED DESCRIPTION OF THE PREFERRED EMBODIMENTS

Figure 1A:
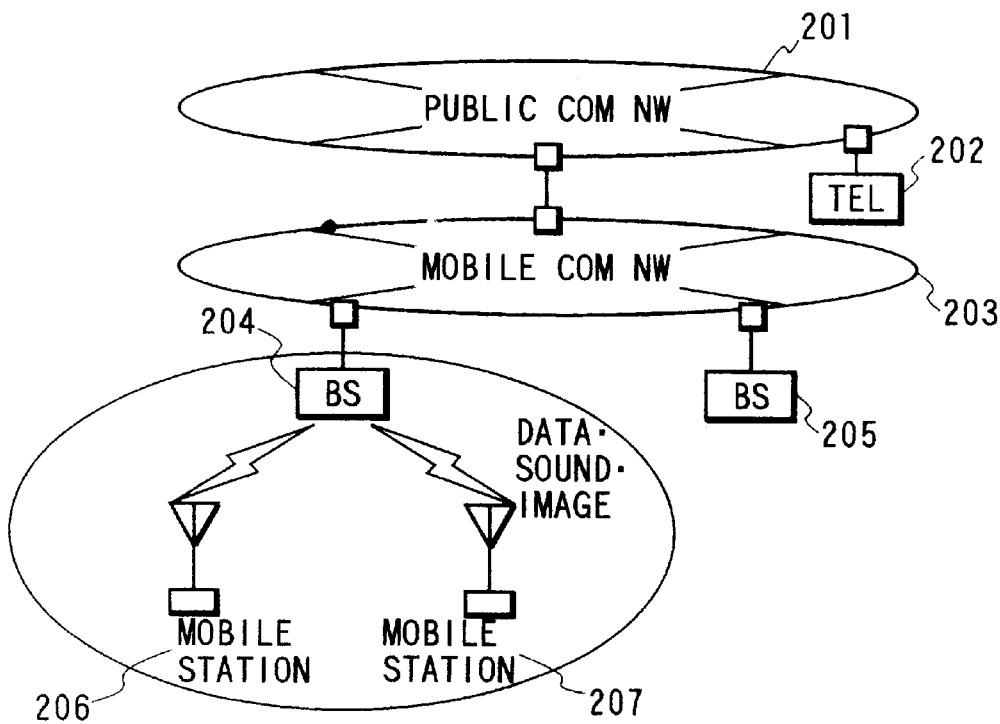
FIG. 1A is a schematic diagram illustrating a network configuration for describing a CDMA communication method and a spread spectrum communication system associated with the present invention.
Figure 1B:
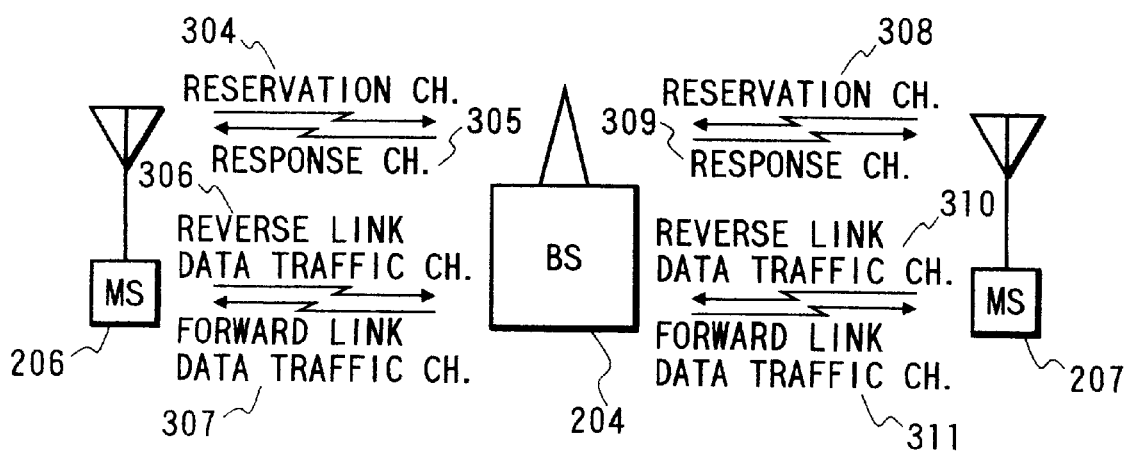
FIG. 1B is a schematic diagram illustrating a two-way communication model of a CDMA communication network shown in FIG. 1A.

A CDMA packet communication method and a spread spectrum communication system associated with the present invention will be described in further detail by way of examples as applied to a mobile communication network. An overall configuration of the mobile communication network is as shown in FIGS. 1A and 1B. In FIG. 1A, reference numeral 201 denotes a public telecommunication network, reference numeral 202 a telephone connected to the public telecommunication network 201, reference numeral 203 denotes a mobile communication network connected to the public telecommunication network 201, reference numerals 204 and 205 base stations in the mobile communication network, and reference numerals 206 and 207 mobile stations belonging to the base station 204. The mobile stations 206 and 207 communicate with each other via the base station 204 in the service area. The information to be transferred is multimedia information containing data, sounds, and images.

FIG. 1B shows a communication model in which the base station 204, the mobile station 206, and the mobile station 207 perform two-way communication in the above-mentioned network. In FIG. 1B, a reservation channel 304 for transmitting a reservation packet, a response channel 305 for transmitting a response packet, a reverse-link data traffic channel 306 for transmitting a reverse-link data packet, and a forward-link data traffic channel 307 for transmitting a forward-link data packet are provided between the base station 204 and the mobile station 206.

A reservation channel 308 for transmitting a reservation packet, a response channel 309 for transmitting a response packet, a reverse-link data traffic channel 310 for transmitting a reverse-link data packet, and a forward-link data traffic channel 311 for transmitting a forward-link data packet are provided between the base station 204 and the mobile station 207.

It is assumed herein that the mobile station 206 transfer information of a low bit rate such as a voice signal, while the mobile station 207 transfer information of a high bit rate such as data.

Figure 2A:
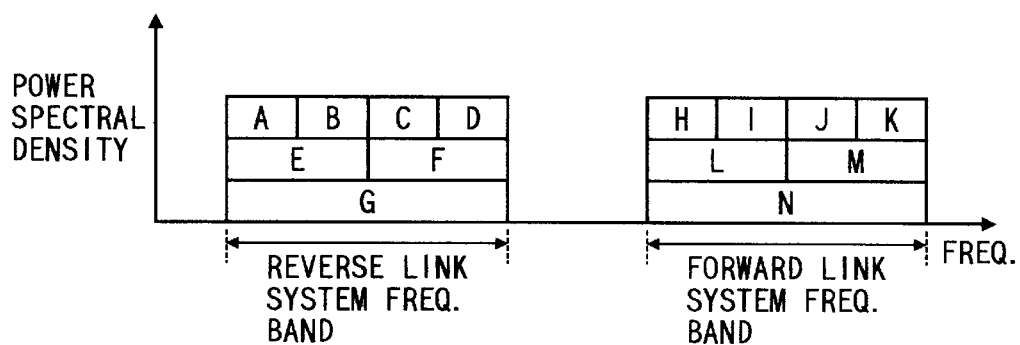
FIG. 2A is a diagram illustrating an example of a system frequency band configuration and an example of a spreading code for describing the CDMA communication method and the spread spectrum communication system according to the present invention.
Figure 2B:
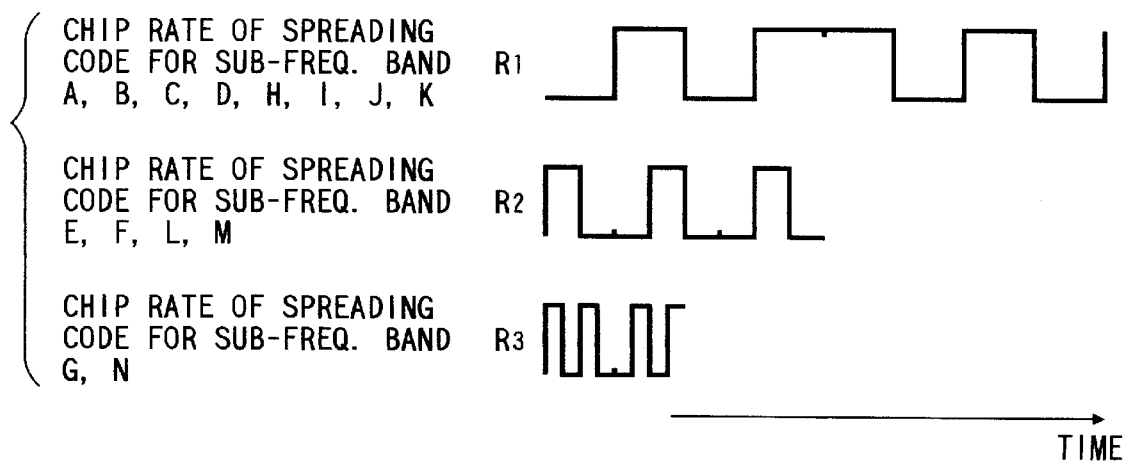
FIG. 2B is a diagram illustrating an example of spreading codes of a frequency band configuration of the CDMA communication system shown in FIG. 2A.

FIGS. 2A and 2B show chip rates of spreading codes corresponding to configurations of frequency bands of the above-mentioned communication system. In FIG. 2A, the vertical axis indicates power spectral density and the horizontal axis indicates frequency. The frequency band assigned to this communication system is divided into a reverse-link system frequency band and a forward-link system frequency band. The bandwidths of these system frequency bands are the same.

In the present invention, sub frequency bands A, B, C, and D having a bandwidth which is ¼ of the system bandwidth, sub frequency bands E and F having a bandwidth which is ½ of the system bandwidth, and a sub frequency band G having the same bandwidth as the system bandwidth are provided in the reverse-link system frequency band.

Likewise, sub frequency bands H, I, J, and K having a bandwidth which is ¼ of the system bandwidth, sub frequency bands L and M having a bandwidth which is ½ of the system bandwidth, and a sub frequency band N having the same bandwidth as the system bandwidth are provided in the forward-link system frequency band.

These sub frequency bands use different carrier frequencies $f_A$ through $f_N$ respectively and, as will be described, can be set by applying spreading codes having different chip rates for the different bandwidths. Each of these carrier frequencies provides the center frequency of each of the sub frequency bands. In the present embodiment, the ratios of the bandwidths of the sub frequency bands to the system bandwidth are ¼, ½, and 1/1. It will be apparent that other values may be used according to the data transfer rates of the mobile stations to be accommodated.

FIG. 2B shows chip rates of the spreading codes to be used for forming different channels in the above-mentioned frequency bands. In the figure, the horizontal axis represents time. R1 denotes the chip rate of spreading codes for packet transmission in channels of sub frequency bands A through D and H through K. R2 denotes the chip rate of spreading codes for packet transmission in channels of sub frequency bands A, F, L, and M. R3 denotes the chip rate of spreading codes for packet transmission in channels of sub frequency bands G and N. R1 has the lowest chip rate, R3 has the highest chip rate, and R2 has the chip rate in between. In each sub frequency band, changing spreading code patterns can form a plurality of channels for a plurality of mobile stations in one band.

Figure 3A:
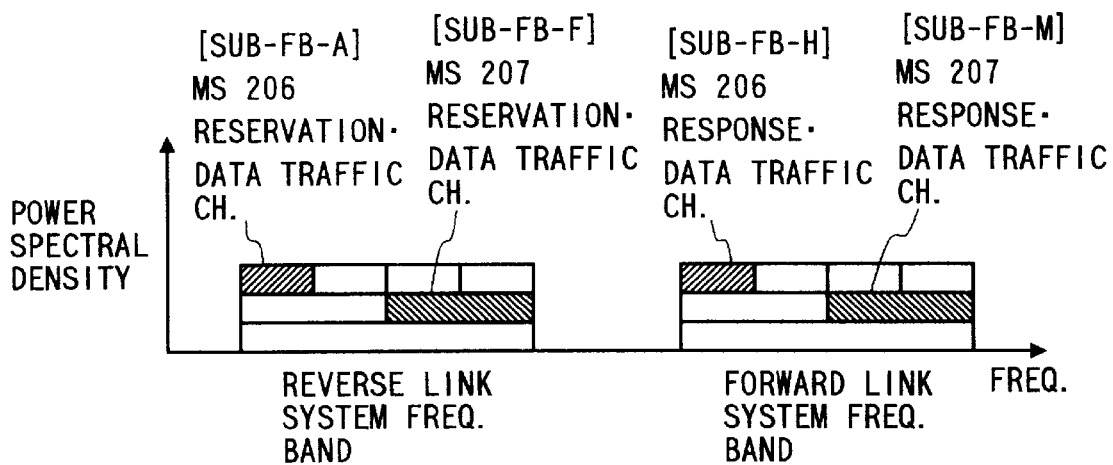
FIG. 3A is a diagram illustrating an usage example of a system frequency band configuration for describing the CDMA communication method and the spread spectrum communication system according to the present invention.
Figure 3B:
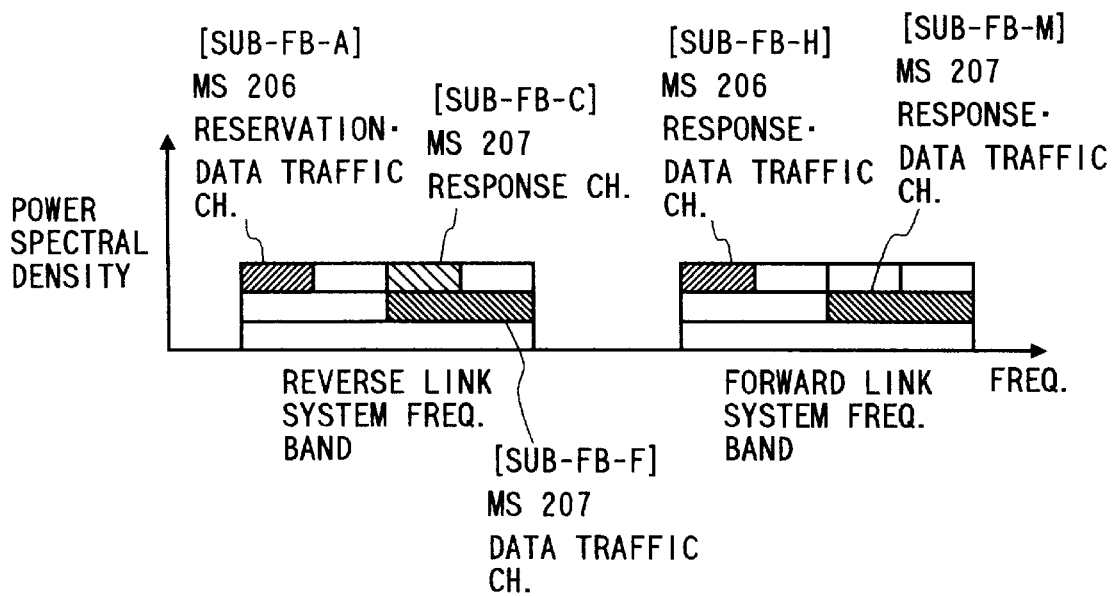
FIG. 3B is a diagram illustrating another usage example of the system frequency band configuration for describing the CDMA communication method and the spread spectrum communication system according to the present invention.

In the present invention, a sub frequency band is selected from the above-mentioned sub frequency bands of various types that is suitable for the data transfer rate of each of the mobile stations (206 and 207). This is shown in FIGS. 3A and 3B. FIG. 3A shows an example in which one sub frequency band is assigned for each of reverse link and forward link. Because the mobile station 206 transfers data at a relatively low transfer rate, the sub frequency band A is assigned to the reverse-link reservation channel 304 and data traffic channel 306 and the sub frequency band H is assigned to the forward-link response channel 305 and data traffic channel 307. Because the mobile station 207 transfers data at a relatively high transfer rate, the sub frequency band F is assigned to the reverse-link reservation channel 308 and data traffic channel 310 and the sub frequency band M is assigned to the forward-link response channel 309 and data traffic channel 311. In correspondence to the bandwidths of these sub frequency bands, the mobile station 206 uses the spreading code of the chip rate R1 and the mobile station 207 uses the spreading code of the chip rate R2.

The reservation channel 304 and the reverse-link data traffic channel 306 of the mobile station 206 that are in the same sub frequency bands are distinguished from each other by the pattern of the spreading code to be used. It should be noted that, for the spreading codes, a PN (Pseudo Noise) series in which incidence probability is random. The transfer rate thereof provides the chip rate. Likewise, the response channel 305 and the forward-link data traffic channel 307 of the mobile station 206, the reservation channel 308 and the forward-link data traffic channel 310 of the mobile station 207, and the response channel 309 and the data traffic channel 311 of the mobile station 207 are distinguished by the difference in spreading code pattern.

FIG. 3B shows another example of sub frequency and assignment in which the sub frequency band of the narrowest bandwidth is assigned to the reservation channels of all mobile stations and the sub frequency band having a bandwidth matching the data transfer rate is assigned to the data packet.

The sub frequency band A and the sub frequency band C are assigned to the channels for transmitting the reservation packets of the mobile stations 206 and 207 respectively. Therefore, the chip rate R1 is used for the chip rate of the spreading code.

As for the data traffic channel, not a so high transfer rate is required between the mobile station 206 and the base station 204, so that the reverse-link data traffic channel shares the sub frequency band A with the reservation channel and the forward-link channel shares the sub frequency band H with the reservation channel. For the reverse-link and forward-link channels, the spreading code of the chip rate R1 is used, the channels being distinguished from each other by the PN series difference.

A high transfer rate is required between the mobile station 207 and the base station 204, so that the reverse-link data traffic channel uses the sub frequency band F and the forward-link data traffic channel uses the sub frequency band M. Therefore, for both the reverse-link and forward-link channels, the spreading code of the chip rate R2 shown in FIG. 2B is used. The sub frequency band M that was assigned to the forward-link data traffic channel is assigned to the response channel.

Figure 4:
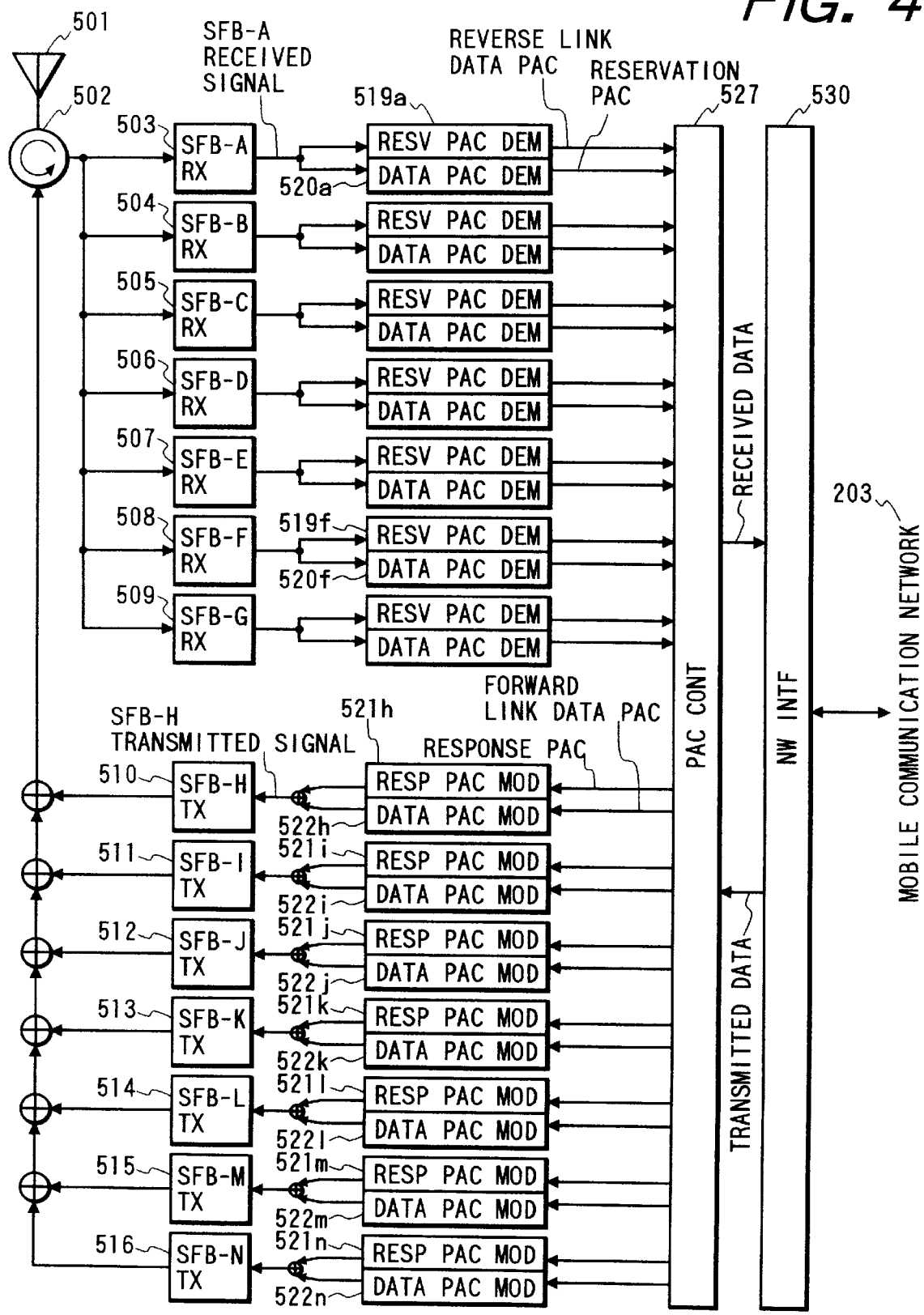
FIG. 4 is block diagram illustrating a first preferred embodiment of the present invention.

The following describes a system practiced by the configuration shown in FIG. 3A. FIG. 4 shows a constitution of the base station 204 of this system. The base station 204 can accommodate the mobile stations of plural types including the mobile station 206 and the mobile station 207. In FIG. 4, reference numerals 503 through 509 denote sub frequency band A (SFB-A) receiver through sub frequency band G (SFB-G) receivers respectively that operate on the sub frequency bands A through G respectively. Reference numerals 519a through 519g denote reservation packet demodulators connected to these receivers respectively. Reference numerals 520a through 520g denote reverse-link data packet demodulators connected to the receivers respectively. Reference numerals 510 through 516 denote respectively sub frequency band H (SFB-H) transmitter through sub frequency band N (SFB-N) transmitter that operate on the sub frequency bands H through N respectively. Reference numerals 521h through 521n denote response packet modulators connected to these transmitters respectively. Reference numerals 522h through 522n denote forward-link data packet modulators connected to the transmitters respectively. Reference numeral 527 denotes a packet controller that receives the reservation packet from each demodulator 519 and the reverse-link data packet from each demodulator 520 and supplies the response packet to each modulator 521 and the forward-link data packet to each modulator 522. Reference numeral 530 denotes a network interface connected to a packet controller 527. Reference numeral 501 denotes an antenna. Reference numeral 502 denotes a circulator for separating a transmitted signal and a received signal. The above-mentioned receivers and demodulators constitute a receiving section, while the above-mentioned transmitters and modulators constitute a transmitting section.

Transmitted signals from the mobile stations are inputted in the receivers via the antenna 501 and the circulator 502. A SFB-A received signal demodulated by the SFB-A receiver 503 having a demodulation carrier of frequency $f_A$ provides the signals coming from a plurality of mobile stations using sub frequency band A which include the mobile station 206. The SFB-A received signal is despread by a spectrum spreading code (this is hereafter referred to as despread-demodulated) in the reservation packet demodulator 519a and the data packet demodulator 520a to provide reservation packets and reverse-link data packets, which are supplied to the packet controller 527.

Likewise, a SFB-F received signal demodulated by the SFB-F receiver 508 having a demodulation carrier of frequency $f_F$ provides the signals coming from a plurality of mobile stations using sub frequency band F which include the mobile station 207. The SFB-F received signal is despread-demodulated in the reservation packet demodulator 519f and the data packet demodulator 520f to provide reservation packets and reverse-link data packets, which are supplied to the packet controller 527.

Because the reservation packets are transmitted from the mobile stations arbitrarily, the base station 204 always keeps all receivers and all reservation packet demodulators in an operating state.

The packet controller 527 schedules the transmission timing according to the contents of the received reservation packet and generates a response packet. The received reverse-link data packet provides received data to be sent to the mobile communication network 203. This received data is given to the network interface 530 to be sent to the mobile communication network 203.

On the other hand, the transmitted data coming from the mobile communication network 203 via the network interface 530 is inputted in the packet controller 527. The packet controller 527 performs scheduling on this data and sets a packet transmission timing (a time slot) thereon to provide a forward-link data packet.

The response packet and the forward-link data packet addressed to the mobile station 206 are spread by spectrum spreading code (this is hereafter referred to as spread-modulated) in the response packet modulator 521h and the forward-link data packet modulator 522h to provide a SFB-H transmitted signal. The SFB-H transmitted signal is modulated by the modulation carrier having frequency $f_H$ in the SFB-H transmitter 510 and the modulated signal is transmitted from the antenna 501 via the circulator 502.

Likewise, the response packet and the forward-link data packet addressed to the mobile station 207 are spread-modulated in the response packet modulator 521m and the forward-link data packet modulator 522m to provide a SFB-M transmitted signal. The SFB-M transmitted signal is modulated by the modulation carrier having frequency $f_M$ in the SFB-M transmitter 515 and the modulated signal is transmitted from the antenna 501.

Figure 5:
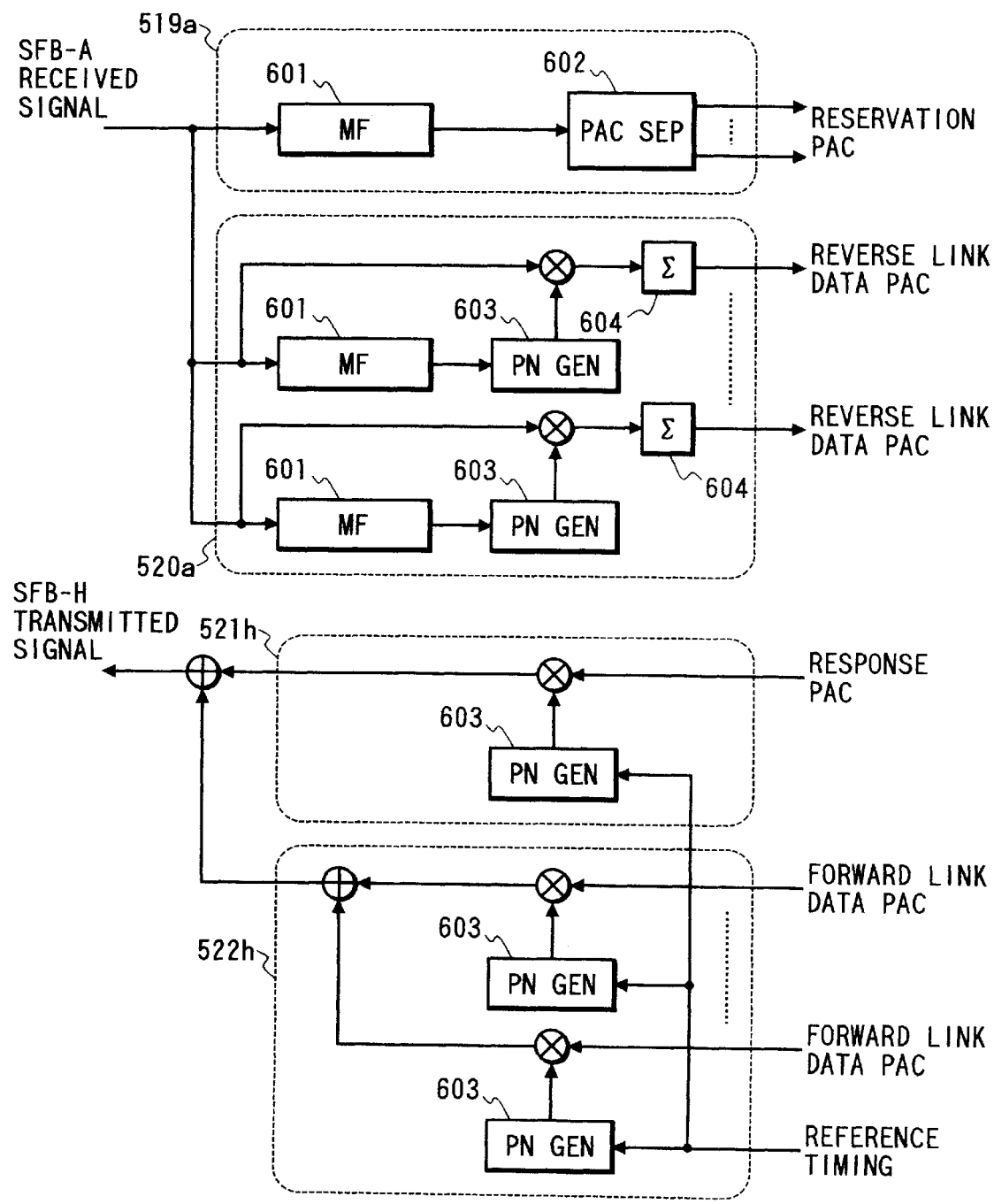
FIG. 5 is a block diagram illustrating a packet modulator and a packet demodulator of a base station shown in FIG. 4.

FIG. 5 shows constitutions of the reservation packet demodulator 519a, the reverse-link data packet demodulator 520a, the response packet modulator 521h, and the forward-link data packet modulator 522h that are used by the base station 204 for the plurality of the mobile stations using sub frequency band A which include the mobile station 206. These demodulators and modulators and those to be used by the other mobile stations constitute the CDMA section of the base station 204.

In the reservation packet demodulator 519a, reservation packets are received through a matched filter (601).

In the matched filter, delay elements are connected in a multistage manner, and results of multiplication of a plurality of coefficients provided for the input tap of the first stage and the output tap of each delay element by the output of corresponding tap are accumulated. A sum of the accumulation is outputted from this matched filter.

Therefore, the delay time of each delay element can be made substantially equal to the chip width and the coefficient of the matched filter can be made a binary PN series ("1" or "−1"), thereby deriving the output of the matched filter as a correlation value, that is a result of despread processing, enabling fast acquisition.

In the sub frequency band A, a unique PN series is used for the reservation channel and the plurality of mobile stations including the mobile station 206 transmit reservation packets at random, so that the packets may overlap with each other in terms of time. Using the above-mentioned function of the matched filter 601 can separate the overlapped packets from each other. A packet separating circuit 602 is connected to the matched filter 601 to separately take out the reservation packets of the plurality of mobile stations.

As for the spreading code for use in each reverse-link data packets, the code of which number for one cycle is higher than the number of spreading codes for use in a reservation packet is employed. The data packet demodulator 520a is composed of the same matched filter 601 as that used for the reservation packet demodulator 519a, PN generator 603, multiplier and accumulator 604 for each mobile station. In the present constitution, the matched filter 601 is used for spreading code timing acquisition.

The transmitting timing (slot number) in which the plurality of mobile stations including the mobile station 206 transmit data packets is determined by scheduling control in the base station 204. Therefore, the receiving timing can be known in the base station 204, allowing the data packet demodulator 520a to operate in the receiving timing for each mobile station.

In the reception processing for the reverse-link data packets, spreading code timing acquisition is performed on the SFB-A received signal by the matched filter 601, the PN series corresponding to each channel of the plurality of mobile stations is generated by the PN generator 603 starting from the timing acquisition, and the received signal is multiplied by the generated PN series to perform despreading. Then, a result of the despreading for one symbol section is integrated by the accumulator 604, and a result of the integration is supplied to the packet controller 527 as a reserve-link data packet.

The response packet modulator 521h is composed of the PN generator 603 and a multiplier. Each response packet transmitted from the base station 204 is spread-modulated by a predetermined PN series generated by the PN generator to provide the SFB-H transmitted signal.

The forward-link data packet modulator 522h is composed of the PN generator 603 and a multiplier for each mobile station. Each forward-link data packet transmitted from the base station 204 is spread-modulated by the unique PN series generated by the PN generator 603 and assigned to the corresponding channel to provide the SFB-H transmitted signal. The spread modulation is performed according to reference timing information supplied from the network interface 530. The SFB-H transmitted signal is supplied to the SFB-H transmitter 510.

Although not shown, this reference timing information is spectrum-spread to provide a pilot signal, which is added to the SFB-H transmitted signal. The reference timing information contained in the pilot signal informs the mobile station of the start point of PN series and the division of time slot.

Figure 6:
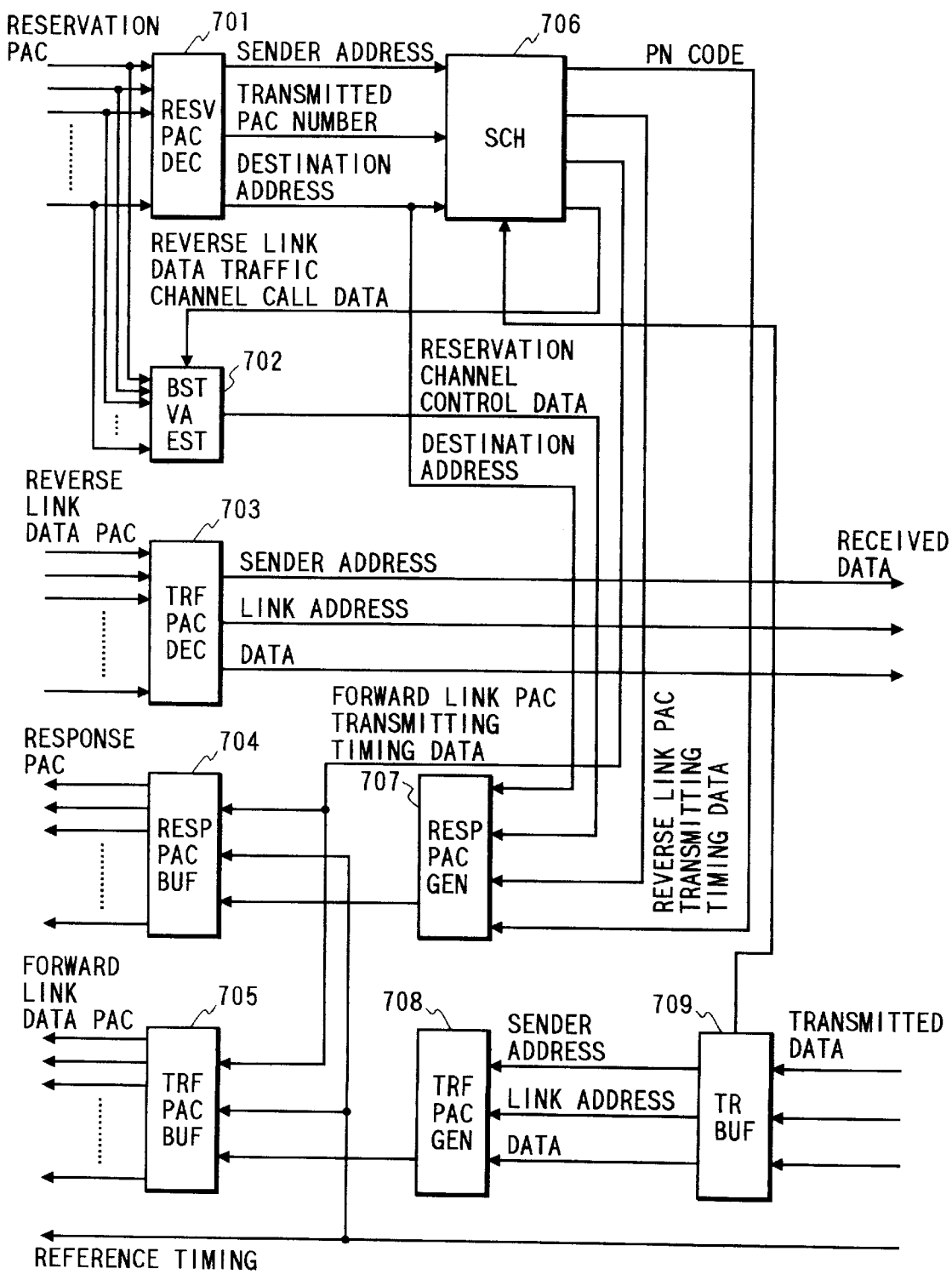
FIG. 6 is a block diagram illustrating a packet controller of the base station shown in FIG. 4.

FIG. 6 shows a constitution of the packet controller 527 of the base station 204. The received reservation packet is decoded by a reservation packet decoder 701; that is, the contents of this packet such as a sender address (identifier), the number of transmitted packets, and a destination address (identifier) are decoded and the decoding result is sent to a scheduler 706. The scheduler 706 performs reverse-link data traffic channel assignment and time slot assignment and determines the type of PN series (PN code) to be given to the reserve-link data packet, a reverse-link data packet transmitting timing, and a forward-link packet transmitting timing. On the other hand, from the number of received reservation packets and the usage status (call data) of the reverse-link data traffic channel given from the scheduler 706, reservation channel control data is generated in a busy tone estimator 702.

A response packet generator 707 generates response packets from the above-mentioned reverse-link data packet transmitting timing and the type of PN series (PN code) given from the scheduler 706, the destination address given from the reservation packet decoder 701, and the reservation channel control data given from the busy tone estimator 702. Each response packet is stored in a response packet buffer 704 once. The stored response packet is read from the response packet buffer 704 according to the forward-link packet transmitting timing coming from the scheduler 706 and the reference timing supplied from the network interface 530. The packet thus read is sent to the corresponding response packet modulator and outputted from the transmitter of the corresponding sub frequency band.

Then, the received reverse-link data packet is decoded by a traffic packet decoder 703; that is, the contents of this packet such as a sender address, a link address, and data are decoded and the decoding result is supplied to the network interface 530 as received data.

On the other hand, transmitted data addressed to the receiving mobile station is added by the network interface 530 with the sender address, the link address, and the data. The resultant data are stored in a transmitting buffer 709 once and then formed by a traffic packet generator 708 into a forward-link data packet. The forward-link data packet is stored in the traffic packet buffer 705 once, sent to the corresponding forward-link data packet modulator according to the forward-link packet transmitting timing data coming from the scheduler 706 and the reference timing supplied from the network interface 530, and outputted from the transmitter of the corresponding sub frequency band.

Figure 7:
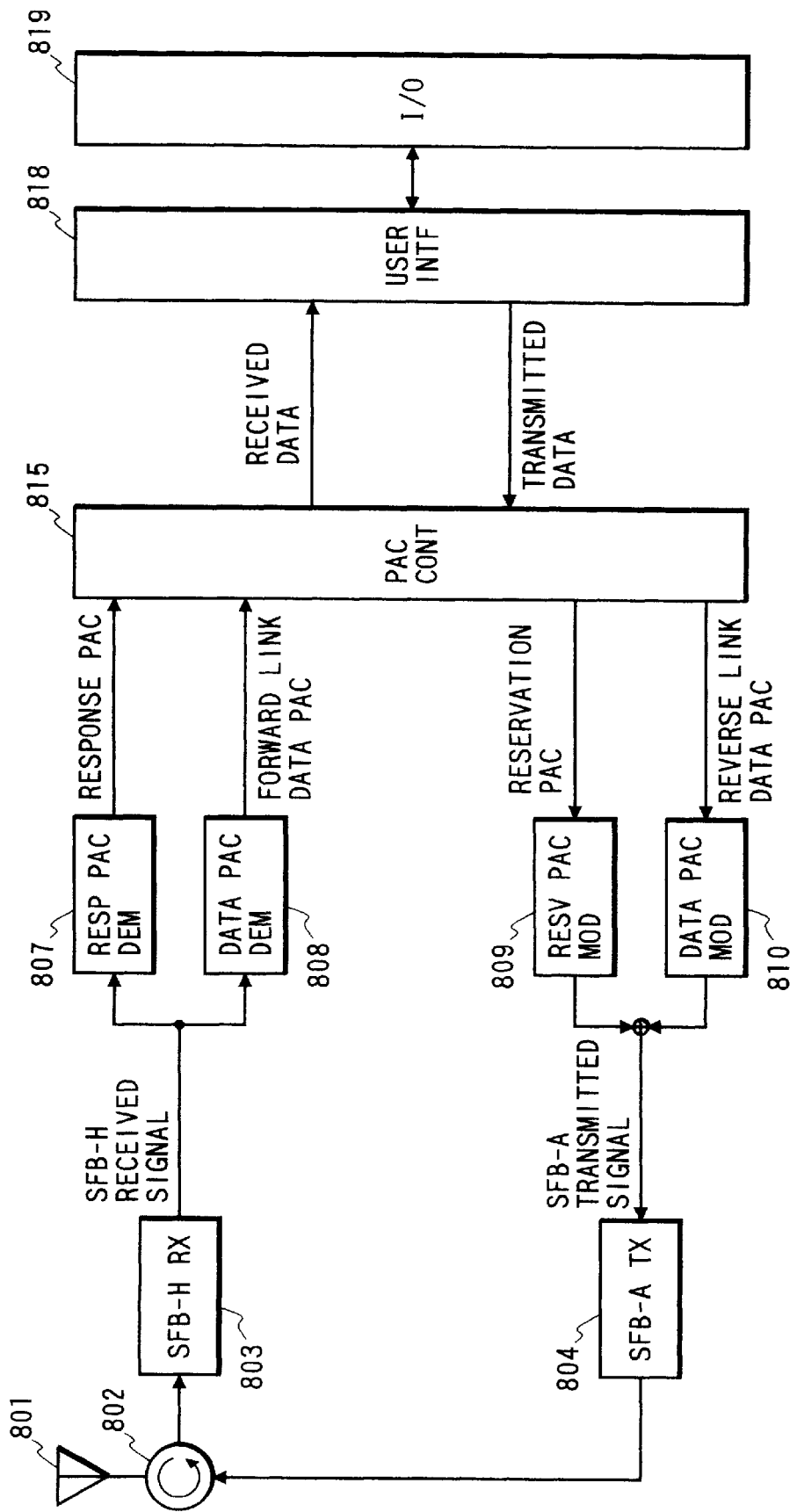
FIG. 7 is a block diagram illustrating a mobile station for describing the first preferred embodiment of the present invention.

The following describes a constitution of the mobile station 206 in the system of FIG. 3A with reference to FIG. 7. In FIG. 7, reference numeral 801 denotes an antenna, reference numeral 802 a circulator, reference numeral 803 a SFB-H receiver for receiving a SFB-H transmitted signal from a reverse-link channel and outputting a SFB-H received signal, reference numeral 804 a reverse-link SFB-A transmitter for transmitting a SFB-A transmitted signal, reference numeral 807 a response packet demodulator connected to the SFB-H receiver 803, reference numeral 808 a data packet demodulator connected to the SFB-H receiver 803, reference numeral 809 a reservation packet modulator connected to the SFB-A transmitter 804, reference numeral 815 a packet controller, reference numeral 818 a user interface, and reference numeral 819 a input/output device. The receiver 803 and the demodulators 807 and 808 constitute the receiving section. The transmitter 804 and the modulators 809 and 810 constitute the transmitting section.

A transmitted signal from the base station 204 is supplied to the SFB-H receiver 803 via the antenna 801 and the circulator 802 and demodulated by the frequency carrier of frequency $f_H$ to provide a SFB-H received signal. The SFB-H received signal is despread-demodulated in the response packet demodulator 807 and the data packet demodulator 808 into a response packet and a forward-link data packet, which are supplied to the packet controller 815.

The packet controller 815 performs control for packet transmitting timing on the these response packet and forward-link data packet. The received data outputted from the packet controller 815 is supplied to the input/output device 819 via the user interface 818.

On the other hand, a reservation packet is generated based on a request to send coming from the input/output device 819. If the state of the reservation channel to be controlled by the packet controller 815 is not congested, the generated reservation packet is inputted in the reservation packet modulator 809 with real-time. The reservation packet is spread-modulated by the modulator 809 to provide a SFB-A transmitted signal. The transmitted data from the input/output device 819 is converted by the packet controller 815 into a data packet and sent to the data packet modulator 810 according to a transmission timing (slot number) notified by the response packet. The data packet is spread-modulated by the spectrum spreading code of the data traffic channel notified by the response packet to provide a SFB-A transmitted signal.

The above-mentioned SFB-A transmitted signal is modulated by the modulation carrier of frequency $f_A$ in the SFB-A transmitter 804 and the modulated signal is transmitted from the antenna 801 via the circulator 802.

Figure 8:
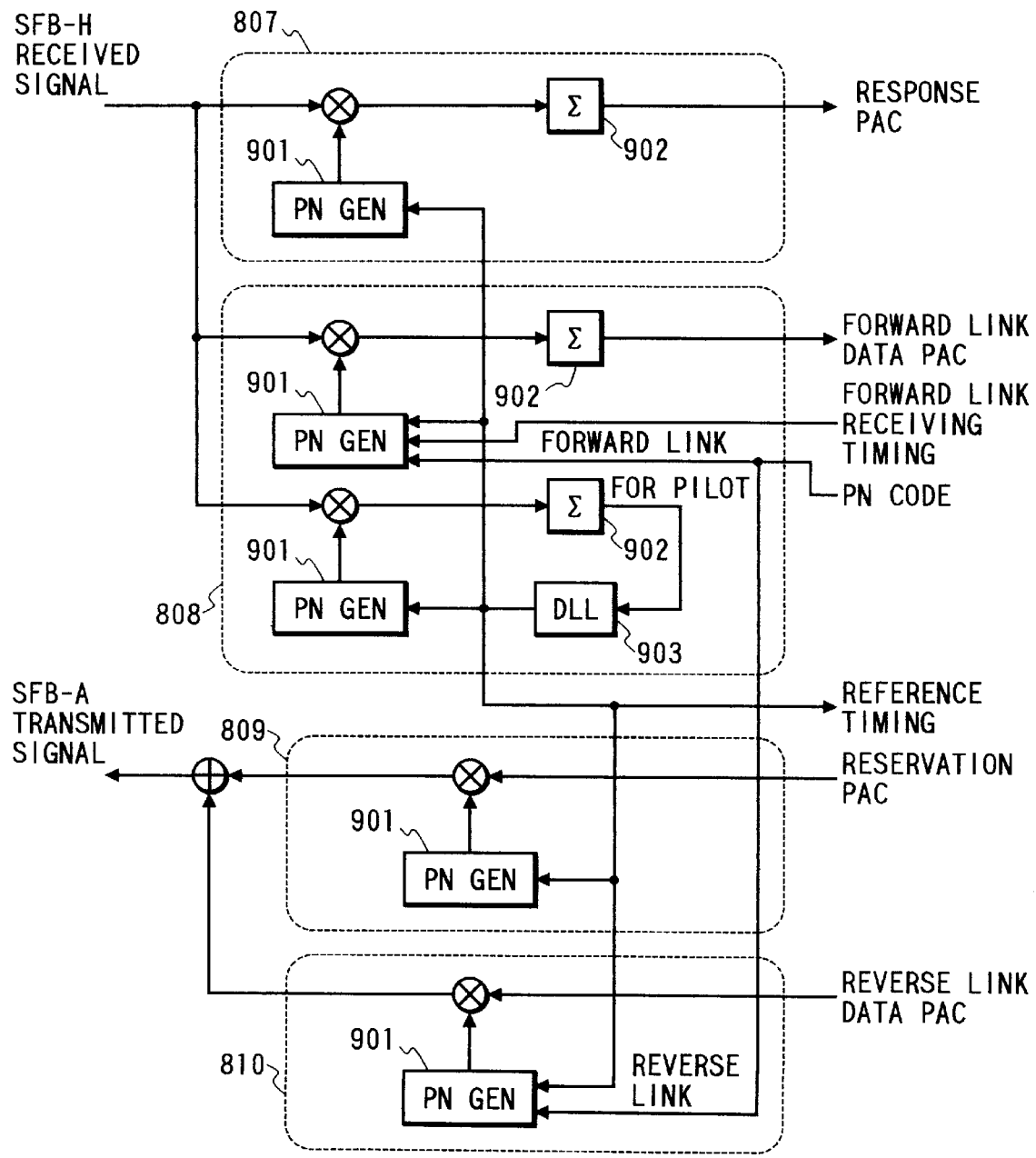
FIG. 8 is a block diagram illustrating a packet modulator and a packet demodulator of the mobile station shown in FIG. 7.

FIG. 8 shows the constitutions of the response packet demodulator 807, the forward-link data packet demodulator 808, the reservation packet modulator 809, and the reverse-link data packet modulator 810. These component devices constitute the CDMA section of the mobile station 206.

The response packet demodulator 807 multiplies the SFB-H received signal outputted from the SFB-H receiver 803 by the spectrum spreading code coming from a PN generator 901 and integrates the multiplication result by an accumulator 902 for one symbol section for despread demodulation. Consequently, a response packet is outputted. The spectrum spreading code used here is a PN series unique to the response channel. According to the reception timing (slot number) indicated by the packet controller 815, the demodulator 808 performs despread-demodulation by performing multiplication by using the assigned spectrum spreading code of PN series and then accumulation. Consequently, the data packet is extracted.

In addition to the response channel and the data channel, the forward-link channels include the channel that transmits the pilot signal described with reference to FIG. 5. The pilot signal of this transmitting channel is despread-demodulated in the demodulator 808 and the resultant signal is outputted to a DLL (Delay Lock Loop) circuit 903. The DLL circuit 903 generates reference timing information for the mobile station 206, performs tracking of the PN generator 901 and, at the same time, controls the timing of the PN generator 901 for reservation packet modulation and the PN generator 901 for reverse-link data packet modulation. This reference timing information is also supplied to the packet controller 815.

The reservation packet modulator 809 and the reverse-link data packet modulator 810 multiply the reservation packet and the reverse-link data packet coming from the packet controller 815 by the uniquely assigned spectrum spreading codes of PN series coming from the PN generator 901 to perform spread modulation.

Figure 9:
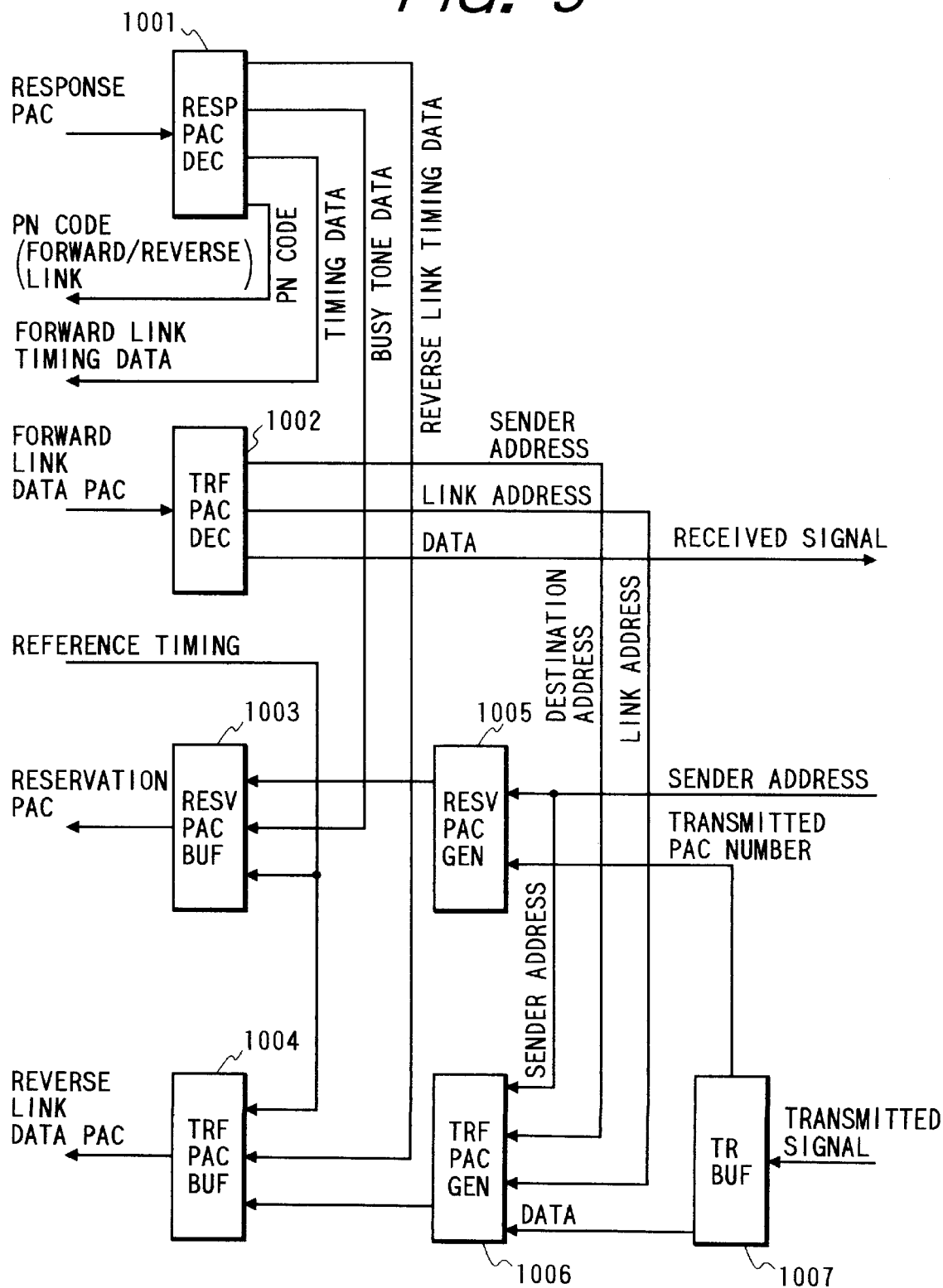
FIG. 9 is a block diagram illustrating a packet controller of the mobile station shown in FIG. 7.

FIG. 9 shows a constitution of the packet controller 815 of the mobile station 206. A response packet decoder 1001 decodes the received packet. That is, the contents of the received packet such as forward-link data packet receiving timing data (slot number), reverse-link data packet transmitting timing data (slot number), busy tone data, and PN series type (PN code) are decoded. The PN series type information is sent to the forward data packet demodulator 808 and the reverse-link data packet modulator 810. The forward-link data packet receiving timing data is sent to the forward-link data packet demodulator 808. A transmitted packet decoder 1002 decodes the contents of the received forward-link data packet such as a sender address, a link address, and data. The decoded data is outputted as received signal.

A transmitting buffer 1007 temporarily stores transmitted data coming from the input/output device 819 via the user interface 818. A reservation packet generator 1005 generates a reservation packet by incorporating such data as a sender address (identifier) and the number of transmitted packets according to the request to send coming from the transmitting buffer 1007. The generated reservation packet is temporarily stored in a reservation packet buffer 1003 and outputted to the reservation packet modulator 809 according to the busy tone information and the reference timing coming from a received response packet.

A traffic packet generator 1006 generates a reverse-link data packet by incorporating the data coming from the transmitting buffer 1007 and the destination address, the link address, and the sender address coming from the received forward-link data packet. The generated reverse-link data packet is temporarily stored in a traffic packet buffer 1004. In the traffic packet buffer 1004, the reference timing information from the demodulator 808 is counted to obtain the division of each time slot and the specified time slot is set with reference to the slot number notified from the response packet decoder 1001. The traffic packet buffer 1004 supplies the data packet to the modulator 810 in the timing of this time slot.

The other mobile stations including the mobile station 207 are basically the same in constitution as the mobile station 206 described above. In each of the mobile stations, the reservation channel and the reverse-link data traffic channel are assigned to a same sub frequency band and the response channel and the forward-link data traffic channel are assigned to a same sub frequency band, so that only one receiver and one transmitter may be provided for each mobile station, resulting in a simplified mobile station constitution.

Figure 10:
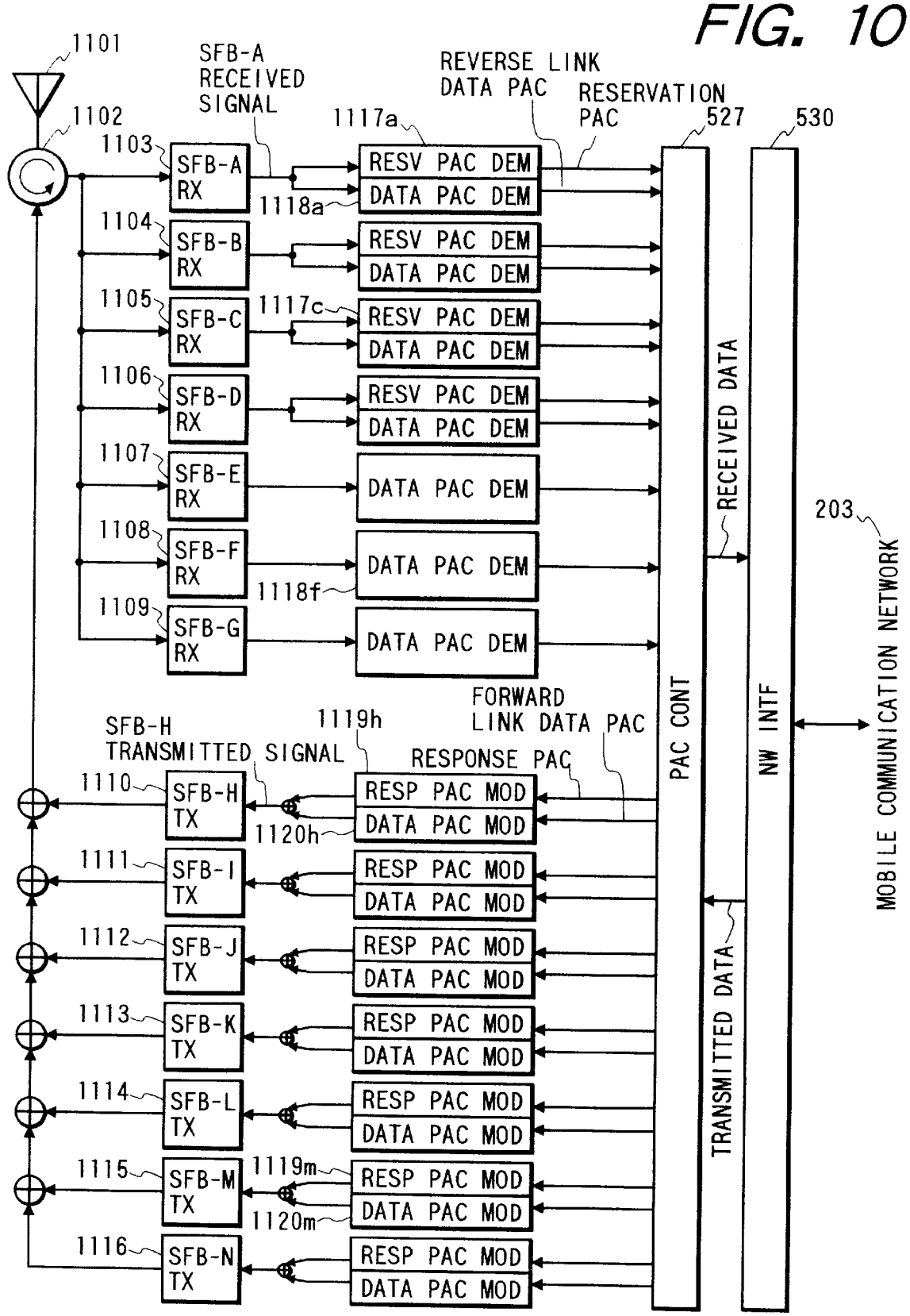
FIG. 10 is a block diagram illustrating a second preferred embodiment of the present invention.

The following describes a system practiced by the constitution shown in FIG. 3B. FIG. 10 shows a constitution of the base station 204 in this system. A difference of this constitution from that shown in FIG. 4 lies in that only data packet demodulators 1118e through 1118g are connected to a SFB-E receiver 1107 through a SFB-G receiver 1109. The reservation packets of all mobile stations taken out via a SFB-A receiver 1103 through SFB-D receiver 1106 and reservation packet demodulators 1117a through 1117d.

The reservation packet and the reverse-link data packet transmitted from the mobile station 206 are taken out of the reservation packet demodulator 1117a and the data packet demodulator 1118a connected to the SFB-A receiver 1103 and supplied to the packet controller 527. The reservation packet transmitted from the mobile station 207 is taken out of the reservation packet demodulator 1117c connected to the SFB-C receiver 1106 and supplied to the packet controller 527. On the other hand, the reverse-link data packet transmitted from the mobile station 207 is taken out of the data packet demodulator 1118f connected to the SFB-F receiver 1108 and supplied to the packet controller 527.

The response packet and the forward-link data packet for the mobile station 206 are spread-modulated by a response packet modulator 1119h and a data packet modulator 1120h respectively and the modulated packets are transmitted from the antenna 1101 via the SFB-H transmitter 510. Likewise, the response packet and the data packet for the mobile station 207 are spread-modulated by a response packet modulator 1119m and a forward-link data packet modulator 1120m respectively and the modulated packets are transmitted from the antenna 1101 via the SFB-M transmitter 1115.

Figure 11:
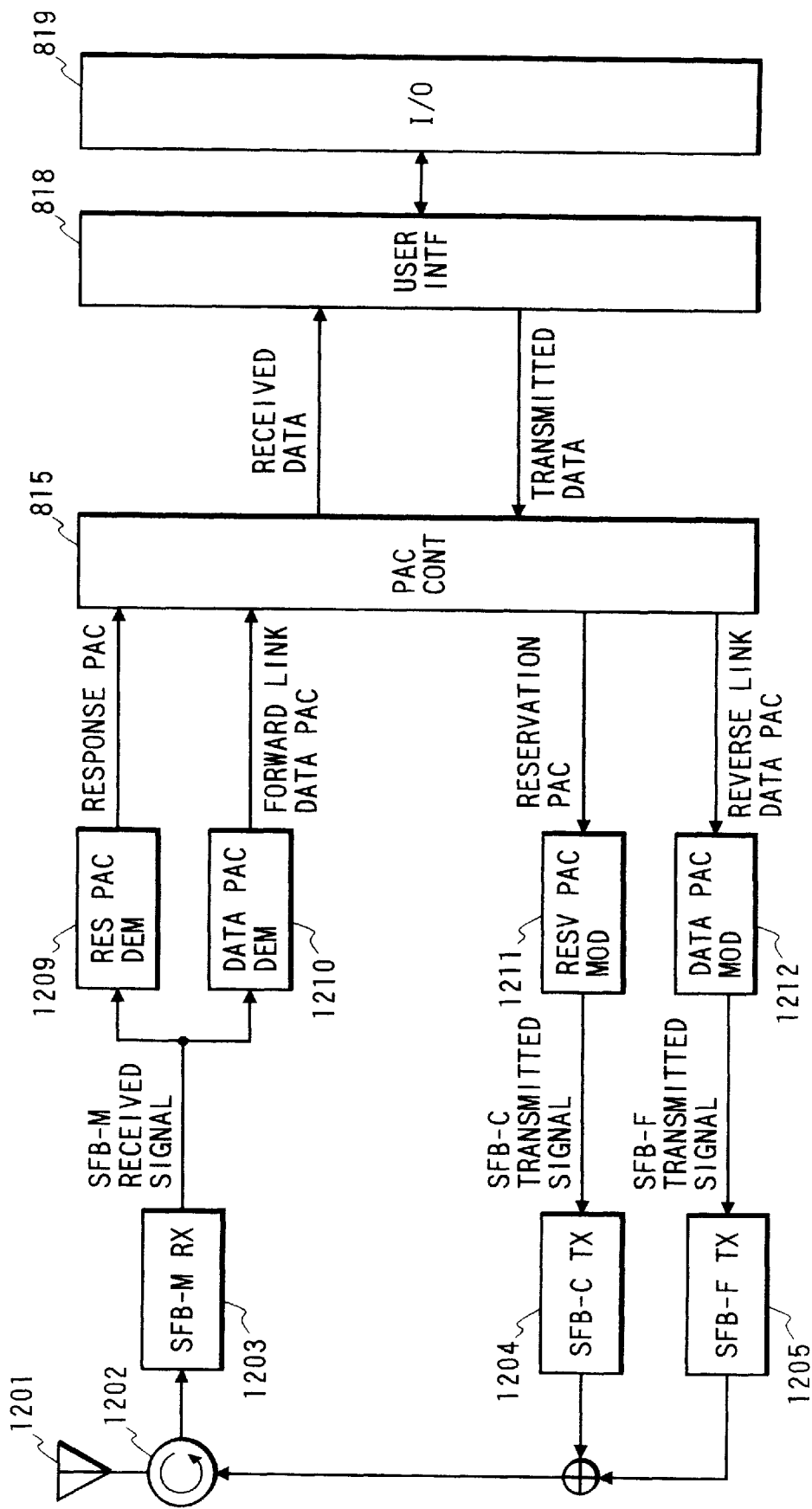
FIG. 11 is a block diagram illustrating a mobile station for describing the second preferred embodiment of the present invention.
Figure 12:
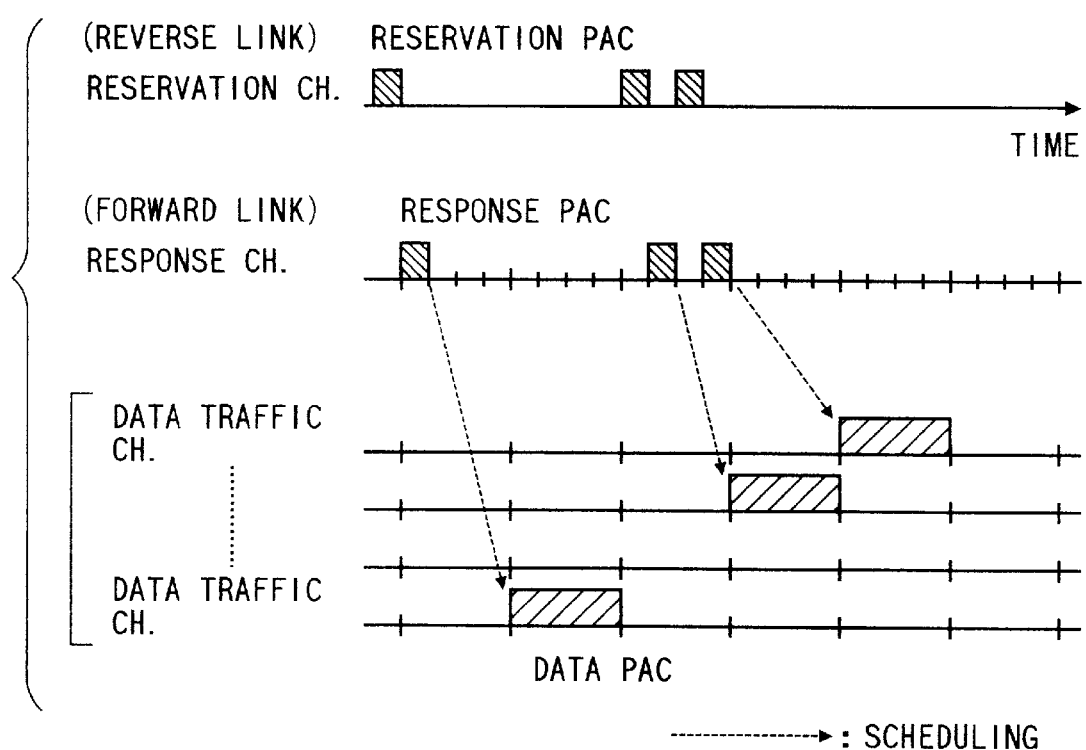
FIG. 12 is a diagram illustrating the prior-art CDMA communication method and spread spectrum communication system.

The constitution of the mobile station 206 is generally the same as that shown in FIG. 7. The constitution of the mobile station 207 is partially different from that shown in FIG. 7. As shown in FIG. 11, the transmitter is divided into a SFB-C transmitter 1204 and a SFB-F transmitter 1205. The reservation packet modulator 1211 is connected to the SFB-C transmitter 1204 and the data packet modulator 1212 is connected to the SFB-F transmitter 1205.

The response packet and the forward-link data packet transmitted from the base station 204 are taken out of a response packet demodulator 1209 and a data packet demodulator 1210 respectively that are connected to the SFB-M receiver 1203 and sent to the packet controller 815.

The reservation packet outputted from the packet controller 815 is spread-modulated by a reservation packet modulator 1211 and the modulated packet is transmitted via a channel formed in the sub frequency band C having a relatively narrow bandwidth via the SFB-C transmitter 1204. The reverse-link data packet is spread-modulated by a data packet modulator 1212 and the modulated packet is transmitted via a channel formed in the sub frequency band F having a relatively wide bandwidth via the SFB-F transmitter 1205.

Because the base station 204 must always monitor the reservation channel, it is effective to use a matched filter for the reservation packet demodulator 1117 (refer to FIG. 10) for passively taking correlation. If the reservation channel is of wide band, a high-speed matched filter is required. However, in this example, all reservation channels are assigned to the sub frequency band having a relatively narrow band width, so that a low-speed matched filter may be used for all matched filters used in the demodulator 1117. The base station 204 need not monitor the channels having a relatively wide band width, resulting in the simplified demodulator constitution of the base station 204.

The mobile station 207 uses an independent transmitter 1204 for reservation packet transmission of narrow band. It will be apparent that the transmitter 1204 may be of narrow band and therefore the constitution of the mobile station 207 may be implemented without much complicating the same.

In the above-mentioned embodiments 1 and 2, the mobile station 206 and the mobile station 207 assign different sub frequency bands to different reservation channels and to different response channels. It will be apparent that a same sub frequency band may be assigned to the reservation channels and a same sub frequency band to the response channels. Channel separation in the same sub frequency band may be realized with ease by use of PN series having different patterns. In the above-mentioned embodiments, the base station and the mobile stations are connected by wireless channels. It will be apparent that the present invention is applicable to the case in which the base station and the mobile stations are connected by wired channels using cables.

As described and according to the invention, data is transmitted by the sub frequency band adapted to the transfer rate of that data, allowing the same to be handled independently of other pieces of data. Further, a plurality of sub frequency bands are usable simultaneously, quickly answering the communication requests of mobile stations. Consequently, multimedia information of various transfer rates may be transmitted efficiently, thereby realizing the flexible provision of communication services.

It is further understood by those skilled in the art that the foregoing description is the preferred embodiments of the disclosed device and that various changes and modifications may be made in the invention without departing from the spirit and scope thereof.

What is claimed is:

1. A code division multiple access communication method of dividing a frequency band in a communication channel between a base station and a plurality of mobile stations belonging to said base station into a reverse-link frequency band for transmitting a packet heading from each of said plurality of mobile stations to said base station and a forward-link frequency band for transmitting a packet heading from said base station to each of said plurality of mobile stations, said base station, in response to a reservation packet coming from each of said plurality of mobile stations, transmitting a response packet to each of said plurality of mobile stations for specifying a data traffic channel and a time slot, each of said plurality of mobile stations transmitting a data packet in said time slot specified on said data traffic channel specified in said response packet, said code division multiple access communication method comprising the steps of:

defining, in each of the reverse link and the forward link frequency band, a plurality of carrier frequencies in correspondence to a plurality of sub frequency bands each having one of bandwidths of a plurality of types, said plurality of sub frequency bands being superimposed on each other in the reverse-link and the forward-link frequency band, and assigning in advance, for each of said plurality of mobile stations, a reverse-link sub frequency band and a forward-link sub frequency band from said plurality of sub frequency bands each of the reverse-link and the forward-link sub frequency band having a bandwidth matching data traffic rate;

spectrum-spreading, by each of said plurality of mobile stations, the reservation packet containing a mobile station identification by a spreading code for a reservation channel and transmitting a resultant packet by the prescribed carrier frequency corresponding to the reverse-link sub frequency band;

spectrum-spreading, by said base station, the response packet addressed to each of said plurality of mobile stations by a spreading code for a response channel and transmitting a resultant packet by the prescribed carrier frequency corresponding to the forward-link sub frequency band assigned to each of said plurality of mobile stations; and spectrum-spreading, by each of said plurality of mobile stations, the data packet by a spreading code for the data traffic channel specified in said response packet and transmitting a resultant packet by the prescribed reverse-link carrier frequency.

2. A code division multiple access communication method according to claim 1, wherein the spreading code for use in spectrum-spreading the data packet has a chip rate corresponding to the bandwidth of the reverse-link sub frequency band.

3. A code division multiple access communication method according to claim 1, wherein, one of said plurality of sub frequency bands that has a narrowest bandwidth of the bandwidths of the plurality of types is assigned in advance to at least one of said plurality of mobile stations as a sub frequency band for a reverse-link control channel, and said at least one of said plurality of mobile stations transmits the spectrum-spread reservation packet by a carrier frequency corresponding to the sub frequency band for said reverse-link control channel and transmits the data packet by a carrier frequency having a bandwidth other than the bandwidth for said reverse-link control channel.

4. A code division multiple access communication method according to claim 1, wherein said plurality of carrier frequencies are related to said plurality of sub frequency bands in advance such that one sub frequency band having a relatively a wide bandwidth is superimposed on a plurality of sub frequency bands having a bandwidth narrower than said relatively wide bandwidth.

5. A spread spectrum communication system composed of a base station and a plurality of mobile stations belonging to said base station, said base station receiving a spectrum-spread reservation packet from each of said plurality of mobile stations and transmitting a spectrum-spread response packet for specifying a data traffic channel and a time slot to each of said plurality of mobile stations, each of said plurality of mobile stations transmitting a spectrum-spread data packet in a timing of the time slot specified on the data traffic channel specified in the response packet, a communication channel between said base station and each of said plurality of mobile stations having a forward-link frequency band for transmitting a packet heading from said base station to each of said plurality of mobile stations and a reverse-link frequency band for transmitting a packet heading from each of said plurality of mobile stations to said base station, said base station comprising:

a plurality of first receiving means each operating by one of a plurality of carrier frequencies predefined in the reverse-link frequency band;

a plurality of first demodulating means, provided for each of said plurality of first receiving means, each for demodulating the spectrum-spread reservation packet and the spectrum-spread data packet by despreading an output signal outputted from each of said plurality of first receiving means;

a plurality of first transmitting means each operating by one of a plurality of carrier frequencies predefined in the forward-link frequency band; and a plurality of first modulating means, provided for each of said plurality of transmitting means, each for spectrum-spreading a response packet and a data packet to output resultant packets to each of said plurality of first transmitting means;

each of said plurality of mobile stations being assigned a reverse-link and a forward-link sub frequency band from a plurality of sub frequency bands related to said each of the carrier frequencies, each of the reverse-link and the forward-link sub frequency band having a bandwidth matching a data traffic rate of each of said plurality of mobile stations, said plurality of sub frequency bands being superimposed on each other in the reverse-link and the forward-link frequency band, each of said plurality of mobile stations comprising:

second receiving means operating by the carrier frequency corresponding to the forward-link sub frequency band:

second demodulating means for demodulating the spectrum-spread response packet and the spectrum-spread data packet from the base station by despreading an output signal outputted from said second receiving means;

second transmitting means operating by the carrier frequency corresponding to the reverse-link sub frequency band; and second modulating means for spectrum-spreading a reservation packet and a data packet to output resultant packets to said second transmitting means.

6. A spread spectrum communication system according to claim 5, wherein each of said plurality of first demodulating means comprises a reservation packet demodulating circuit for demodulating a plurality of reservation packets having different phases spread by spreading codes having a same pattern from the output signal of said first receiving means to separate the plurality of reservation packets from each other and a data packet demodulating circuit for demodulating a plurality of data packets spectrum-spread by spreading codes having different patterns from the output signal of said first receiving means to separate the plurality of data packets from each other, and each of said plurality of first modulating means comprises a response packet modulating circuit for sequentially spectrum-spreading the response packet addressed to each of the plurality of mobile stations and a data packet modulating circuit for spectrum-spreading the data packet addressed to each of said plurality of mobile stations by a spreading code unique to each data traffic channel.

7. A spread spectrum communication system according to claim 6, wherein said data packet demodulating circuit despreads the output signal of said first receiving means by a spreading code of a prescribed chip rate corresponding to the carrier frequency of each of said plurality of first receiving means, said data packet modulating circuit spectrum-spreads the data packet addressed to each of said plurality of mobile stations by a spreading code of a prescribed chip rate corresponding to the carrier frequency of each of said first receiving means, said second demodulating means despreads the output signal of said second receiving means by a spreading code of a prescribed chip rate corresponding to the carrier frequency of said second receiving means, and said second modulating means spectrum-spreads the data packet by a spreading code of a prescribed chip rate corresponding to the carrier frequency of said second transmitting means.

8. A mobile station constituting by a plurality of said mobile stations a spread spectrum communication system along with a base station, said mobile station transmitting a spectrum-spread reservation packet to said base station by use of a reverse-link frequency band, receiving a spectrum-spread response packet for specifying a data traffic channel and a time slot from said base station by use of a forward-link frequency band, and transmitting a spectrum-spread data packet in a timing of the time slot specified on the data traffic channel specified in the spectrum-spread response packet to said base station by use of the reverse-link frequency band, said mobile station being assigned a reverse-link and a forward-link sub frequency band from a plurality of sub frequency bands related to each of carrier frequencies, each of the reverse-link and forward-link sub frequency band having a bandwidth matching a data traffic rate of each of said plurality of mobile stations, said plurality of sub frequency bands being superimposed on each other in the reverse-link and the forward-link frequency band, said mobile station comprising:

receiving means operating by the carrier frequency corresponding to the forward-link sub frequency band;

demodulating means for demodulating the spectrum-spread response packet and a spectrum-spread data packet from said base station by despreading on output signal outputted from said receiving means;

transmitting means operating by the carrier frequency corresponding to the reverse-link sub frequency band; and modulating means for spectrum-spreading a reservation packet and a data packet to output resultant packets to said transmitting means.

9. A mobile station according to claim 8, wherein said demodulating means despreads the output signal of said receiving means by a spreading code of a prescribed chip rate corresponding to the carrier frequency of said receiving means and said modulating means spectrum-spreads the data packet by a spreading code of a prescribed chip rate corresponding to the frequency of said transmitting means.

* * * * *